United States Patent [19]

McMordie et al.

[11] 4,246,987
[45] Jan. 27, 1981

[54] MOUNTING ASSEMBLY FOR ELECTRICALLY CONDUCTIVE RAIL

[75] Inventors: James R. McMordie; Donald A. Sloan, both of Winston-Salem, N.C.

[73] Assignee: Envirotech Corporation, Menlo Park, Calif.

[21] Appl. No.: 26,980

[22] Filed: Apr. 4, 1979

[51] Int. Cl.³ .............................................. B60M 1/30
[52] U.S. Cl. ..................................................... 191/32
[58] Field of Search ................. 191/23 R, 23 A, 29 R, 191/30, 32, 40

[56] References Cited

U.S. PATENT DOCUMENTS

| 823,438 | 6/1906 | Price . | |
|---|---|---|---|
| 1,342,034 | 6/1920 | Todhunter . | |
| 1,586,723 | 6/1926 | Wahlberg . | |
| 2,207,860 | 7/1940 | Hassler . | |
| 2,824,913 | 2/1958 | Taylor . | |
| 2,991,336 | 7/1961 | Shaw | 191/30 X |
| 3,334,197 | 8/1967 | Boden | 191/40 |
| 3,882,978 | 5/1975 | Cookston . | |
| 3,892,299 | 7/1975 | Kilburg . | |
| 3,998,306 | 12/1976 | Howell . | |
| 4,049,092 | 9/1977 | Lillard . | |
| 4,163,485 | 8/1979 | Howell | 191/32X |

Primary Examiner—Richard A. Schacher
Attorney, Agent, or Firm—Robert E. Krebs

[57] ABSTRACT

A mounting assembly for securing an electrically conductive rail to a support structure comprises a resilient clip configured to grasp an electrically insulating sleeve that encloses the electrically conductive rail. A longitudinal opening in the sleeve exposes the rail so as to permit sliding electrical contact along the rail by a shoe or other type of conductor for providing power to an electrically driven movable device or vehicle that travels along a track or pathway defined generally by the rail. The resilient clip is seated within a bracket, and a securing means coadunately fastens the clip to the bracket and the bracket to the support structure. A plurality of such mounting assemblies can be used to secure a plurality of such rails to the support structure in adjacent parallel disposition with respect to each other, where each mounting assembly secures a corresponding one of the rails to the support structure independently of the other mounting assemblies.

20 Claims, 5 Drawing Figures

MOUNTING ASSEMBLY FOR ELECTRICALLY CONDUCTIVE RAIL

BACKGROUND OF THE INVENTION

1. Field of the Invention

This invention pertains to the mounting of an electrically conductive rail system for providing power to electrically driven devices that move along tracks.

2. State of the Prior Art

Electrically conductive rail systems are widely used in industrial plants for providing power to drive movable hoists, monorail vehicles, and various types of trolley devices. In textile plants, for example, electrified rail systems are utilized to provide power for suction and blowing types of travelling cleaners for removing lint from machinery surfaces and from the floor.

An electrically conductive rail was typically made in the prior art by forming an elongate strip of metal into a modified "FIG.-8" configuration, with a flat longitudinally-extending medial portion of the elongate strip lying between rounded edge portions that are folded so as to form eyelets. A conductive rail of this type is typically encased in an electrically insulating sleeve having a longitudinally-extending opening that exposes the flat medial portion of the rail to contact with a shoe or other type of electrical conductor that slides thereon for providing power to an electrically driven device or vehicle. The electrically conductive rail enclosed in its insulating sleeve, or more typically a system comprising a plurality of such rails enclosed in their individual insulating sleeves, is mounted on a support structure so that the rail or rails extend generally parallel to a track or other pathway along which the electrically driven device or vehicle is to travel.

In mounting such an electrically conductive rail to a support structure in the prior art, it was usual to provide a resilient clip configured to grasp the insulating sleeve surrounding the rail in such a way that the exposed flat medial portion of the rail was oriented to permit sliding contact along the rail by an electrically conductive contact shoe of the device or vehicle to be driven. In the usual case, a plurality of such resilient clips were arranged parallel to each other and secured to each other by a bolt that passed through each of the clips. The means for positioning the resilient clips securely with respect to each other also served to fasten the clips together as a group to some sort of spacing means. Such a spacing means in the prior art usually was not an integral structure but rather typically comprised a plurality of spacing devices, with a separate spacing device being provided between each two adjacent clips. Each spacing device was separately secured, as by a bolt and nut, to the support structure.

A mounting assembly typical of the prior art for securing an electrically conductive rail system to a support structure is illustrated in FIGS. 1 and 2. As seen in FIG. 1, resilient clips 10, 11 and 12 are fixedly retained in spaced-apart proximity to each other by means of a bolt 15 and nut 16 and spacing members 20 and 21. The resilient clips 10, 11 and 12 are interchangeable with each other, and each clip is configured to grasp an insulating sleeve enclosing an electrically conductive rail. The clips 10, 11, and 12 retail the rails parallel to each other.

Each of the resilient clips 10, 11 and 12 has a generally U-shaped cross-sectional configuration, with the upper portions of the arms of each clip being curved to provide facing concave surfaces for grasping an insulating sleeve enclosing a conductive rail. The bolt 15 passes through apertures in the vertical lower portions of the arms of each of the clips 10, 11 and 12. The adjacent clips 10 and 11 are spaced apart from each other by the spacing member 20, and the adjacent clips 11 and 12 are spaced apart from each other by the spacing member 21. The spacing members 20 and 21 are secured to a support structure 25 by nuts and bolts indicated by the reference numbers 30 and 31, respectively. The support structure 25 is typically an I-beam, which may be suspended from the ceiling, or mounted on the floor or on the casing of the machine.

The spacing members 20 and 21 are formed from relatively short strips of metal, which are folded so as to provide loops that are aligned with the apertures in the vertical lower portions of the arms of the clips 10, 11 and 12. The bolt 15 passes through the loop formed by each of the spacing members 20 and 21, each spacing member being interposed between two adjacent resilient clips. The spacing members 20 and 21 are shaped on their longitudinal edges so as to provide seats for the horizontal and lower vertical portions of the resilient clips 10, 11 and 12. In this way, the bolt 15 and nut 16 secure the clips 10, 11 and 12 to the spacing members 20 and 21; and the bolts 30 and nuts 31 secure the spacing members 20 and 21 to the support structure 25.

In FIG. 2, the prior art mounting assembly of FIG. 1 is shown in plan view. The bolts 30 that secure the spacing members 20 and 21 to the support structure 25 are visible adjacent both ends of each of the spacing members 20 and 21. The bolt 15, which secures the clips 10, 11 and 12 in proper disposition with respect to each other and with respect to the spacing members 20 and 21, is seen passing through the lower portions of the clips 10, 11 and 12 under loop portions of the interposed spacing members 20 and 21.

Thus, in the prior art rail mounting technique as illustrated in FIGS. 1 and 2, a single clamping means comprising the bolt 15 and nut 16 provided the entire clamping force for squeezing the resilient clips 10, 11 and 12, whereby the clips could grasp the electrically insulating sleeves enclosing the electrically conductive rails. The clips 10, 11 and 12 were not independently clamped, and any looseness that might develop in the grip of the nut 16 on the bolt 15 would affect the tenacity of the grasp of each of the clips 10, 11 and 12 on its respectively held sleeve and enclosed rail. Furthermore, in the prior art, the clamping means for enabling the clips 10, 11 and 12 to grasp the sleeves and enclosed rails securely was independent of the means for securing the clips 10, 11 and 12 to the support structure 25.

SUMMARY OF THE INVENTION

It is an object of the present invention to provide a mounting assembly for securing each rail in an electrically conductive rail system to a support structure independently of other rails in the system, whereby each rail can be held fast to the support structure regardless of any looseness that might develop in the attachment of any other rail to the support structure.

It is also an object of the present invention to provide a mounting assembly for securing an electrically conductive rail system to a support structure using common commercially available hardware with a minimum of specially made components, thereby providing economy in the installation of such a system.

It is a further object of this invention to provide a mounting assembly for securing an electrically conductive rail system to a support structure wherein the rails of the system are prevented from creeping along the support structure, which tends to occur with mounting techniques where the clips grasping the rails are not directly fastened to the support structure.

The present invention provides a mounting assembly for securing an electrically conductive rail to a support structure, the rail being enclosed in an electrically insulating sleeve, with a longitudinally extending opening in the sleeve exposing a portion of the rail so as to permit sliding contact along the rail by a shoe or other type of conductor for transmitting power to an electrically driven device or vehicle. The mounting assembly of the present invention comprises a resilient clip configured to grasp the insulating sleeve enclosing the rail, a bracket configured to receive the resilient clip, and means passing through apertures in the clip and in the bracket for directly fastening the clip and the bracket to the support structure.

The fastening means according to the present invention coadunately secures the resilient clip to the bracket and the bracket to the support structure. A plurality of mounting assemblies according to the present invention can be used to secure a plurality of electrically conductive rails to the support structure, with the rails being disposed parallel to each other, each mounting assembly securing a corresponding one of the rails to the support structure independently of the other mounting assemblies.

DESCRIPTION OF PREFERRED EMBODIMENT

Figure 1:
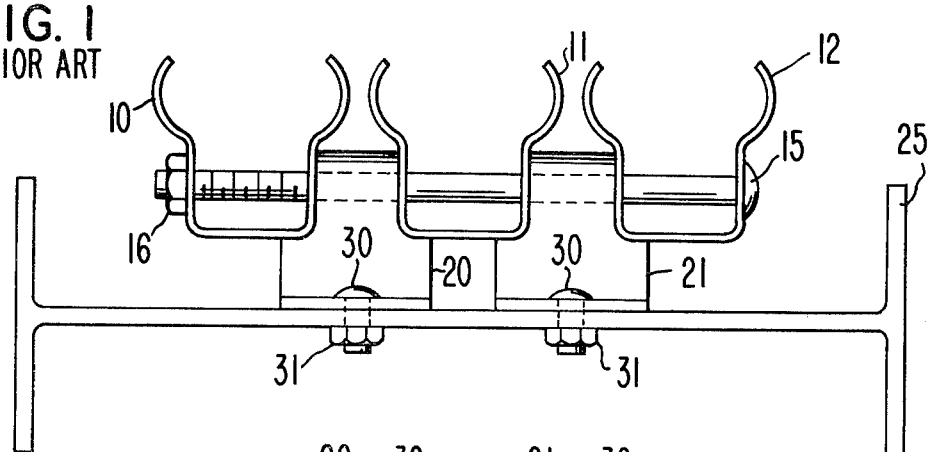
FIG. 1 is a cross-sectional view of a typical prior art assembly for mounting an electrified rail system to a support structure.
Figure 2:
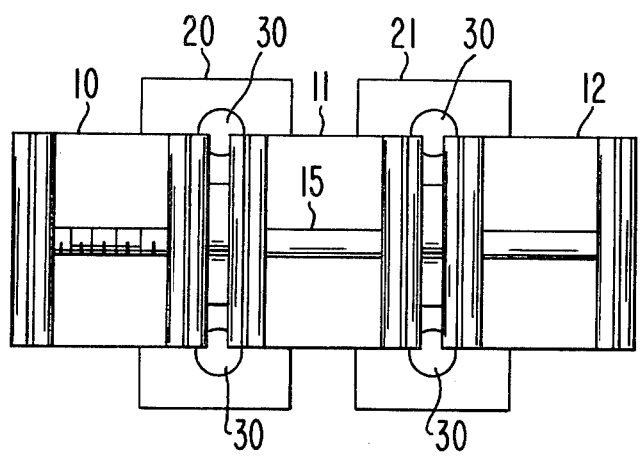
FIG. 2 is a plan view of the prior art mounting assembly of FIG. 1.
Figure 3:
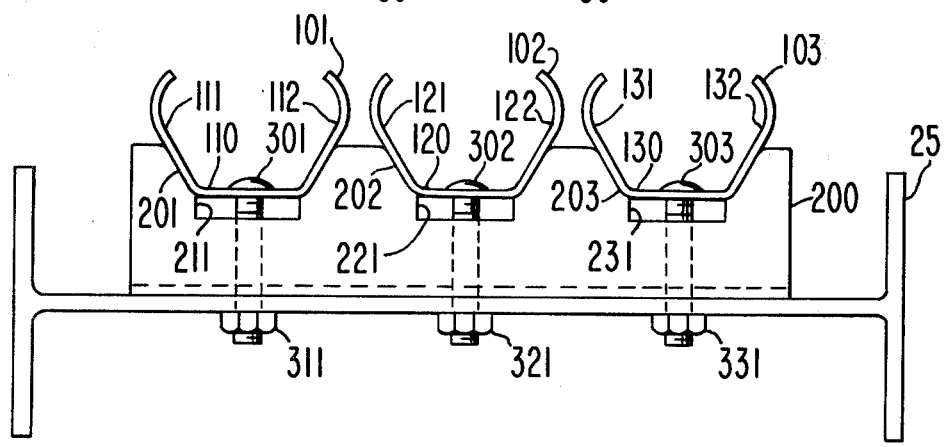
FIG. 3 is a cross-sectional view of an assembly according to the present invention for mounting an electrified rail system to a support structure.
Figure 4:
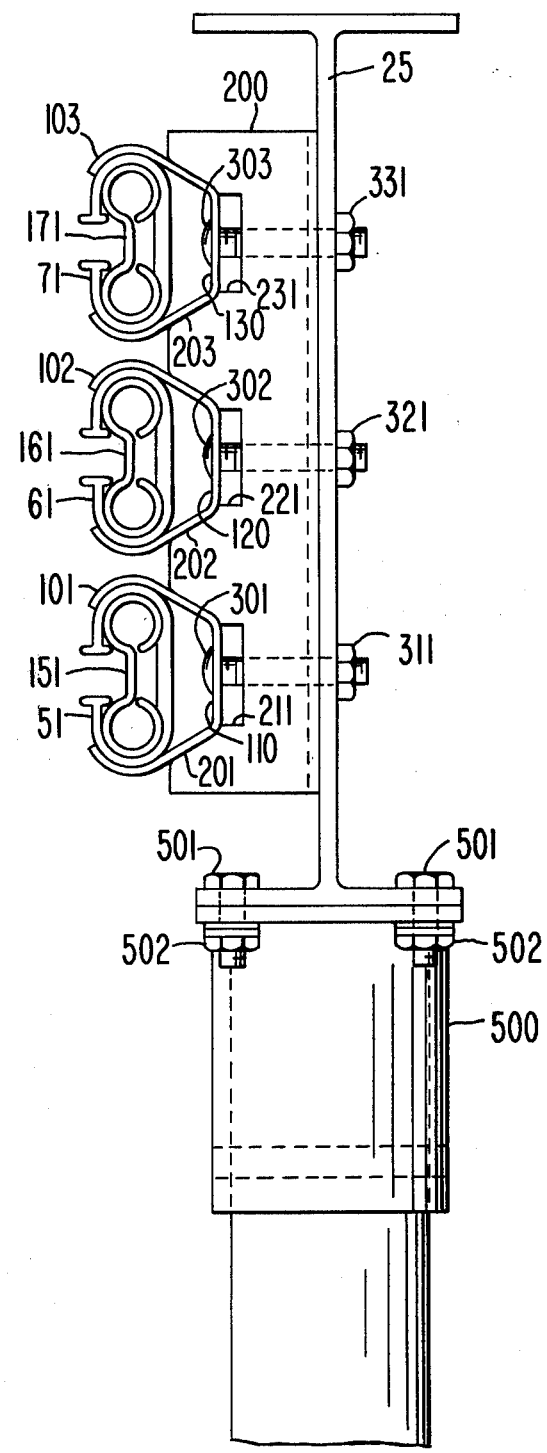
FIG. 4 is a cross-sectional view as in FIG. 3 further showing a system of electrically conductive rails (each rail being enclosed in an electrically insulating sleeve) mounted according to the present invention, with the support structure for the rail system being secured as in a typical floor-mounted arrangement.
Figure 5:
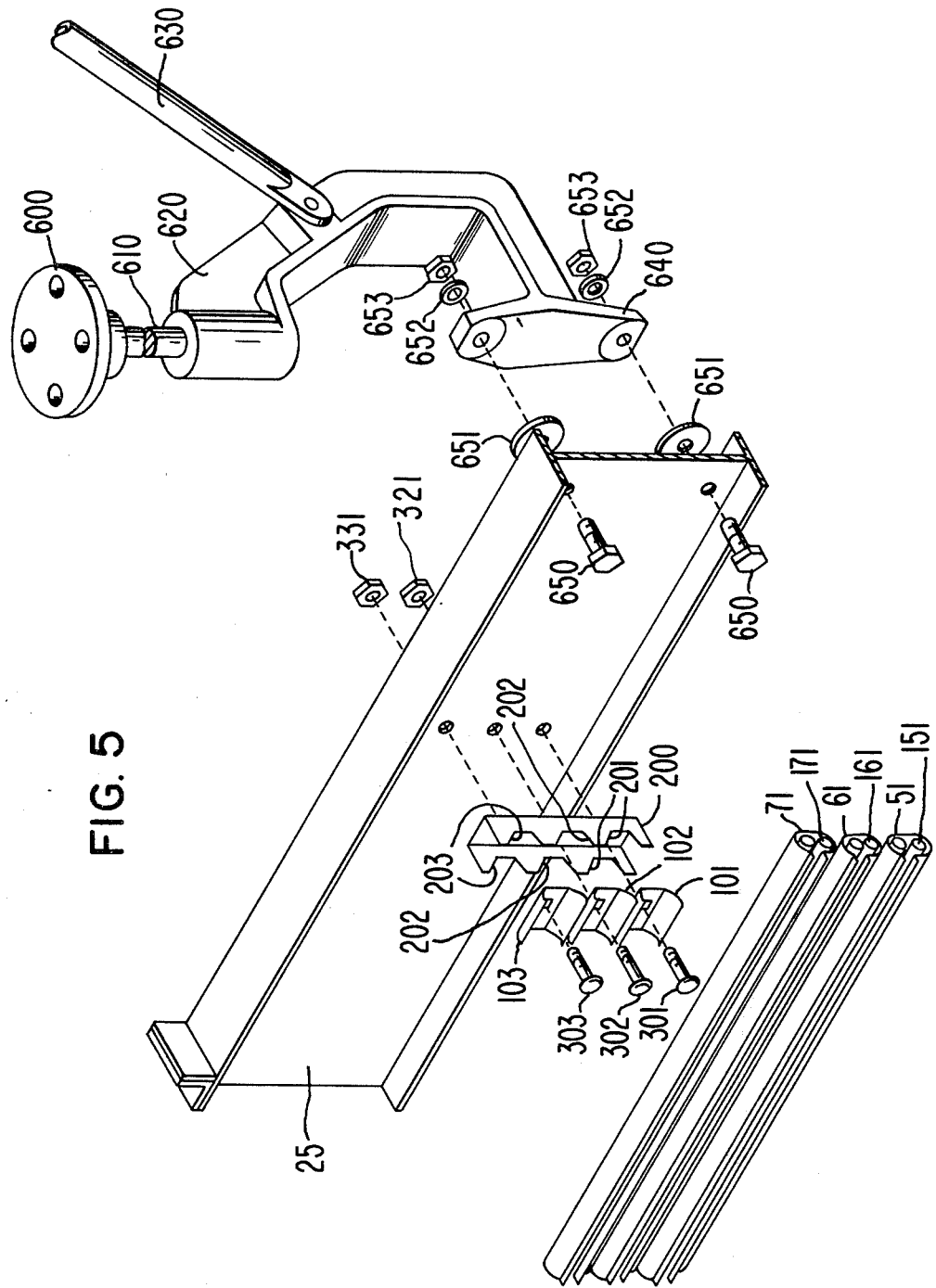
FIG. 5 provides an exploded view of the electrified rail system mounting assembly of the present invention, including means for securing the assembly as in a typical ceiling-mounted arrangement.

A mounting assembly according to the present invention is shown in FIGS. 3, 4 and 5. In FIG. 3, each one of a plurality of resilient clips 101, 102 and 103 is configured to grasp a corresponding one of a plurality of insulating sleeves (not shown), with an electrically conductive rail being enclosed within each sleeve. Each clip is received within a pair of aligned notches provided on oppositely facing edges of the arms of a mounting bracket 200 having a U-shaped cross-section. Thus, the clip 101 is seated in a pair of notches 201; the clip 102 is seated in a pair of notches 202; and the clip 103 is seated in a pair of notches 203.

The resilient clip 101 is fabricated from a relatively short strip of metal that is folded to provide a planar medial portion 110, with two arm portions 111 and 112 facing each other and extending symmetrically from opposite sides of the medial portion 110. Each of the arm portions 111 and 112 has a generally planar part proximal to the medial portion 110 and a curved part distal from the medial portion 110. The curvature of the distal parts of the arm portions 111 and 112 is concave such that the clip 101 can grasp securely an insulating sleeve with an electrically conductive rail enclosed within the sleeve.

The resilient clips 102 and 103 are substantially identical to the clip 101. Thus, as shown in FIG. 3, the clip 102 is configured to have planar medial portion 120, with two arm portions 121 and 122 facing each other and extending symmetrically from opposite sides of the medial portion 120. Similarly, the clip 103 is configured to have a planar medial portion 130, with two arm portions 131 and 132 facing each other and extending symmetrically from opposite sides of the medial portion 130. The arm portions of the clips 102 and 103 are configured just as the arm portions of the clip 101 so that each clip can grasp securely an insulating sleeve with an electrically conductive rail enclosed within the sleeve.

As shown in FIG. 3, the lower portion of each notch in each of the pairs 201, 202 and 203 is preferably configured as a rectangular well. Thus, a well 211 is provided in the lower portion of each notch in the pair of notches 201; a well 221 is provided in the lower portion of each notch in the pair of notches 202; and a well 231 is provided in the lower portion of each notch in the pair of notches 203. The purpose of these wells is explained hereinafter.

The curved distal parts of the arm portions 111 and 112 of the clip 101, of the arm portions 121 and 122 of the clip 102, and of the arm portions 131 and 132 of the clip 103 are preferably coated with an electrically insulating material such as a layer of polyvinyl chloride. For manufacturing convenience, it may be desirable to provide a coating of electrically insulating material over the entire surface of each of the clips 101, 102 and 103. This electrically insulating coating has no effect on the grasping function of the clips, but may be appropriate in view of the requirements of certain electrical codes or governmental regulations.

The medial portion 110 of the clip 101 is apertured to enable passage of a bolt 301 therethrough. In a similar way, the medial portion 120 of the clip 102 is apertured to permit passage of a bolt 302 therethrough, and the medial portion 130 of the clip 103 is apertured to permit passage of a bolt 303 therethrough. The bottom portion of the mounting bracket 200, which has a generally U-shaped cross-sectional configuration, lies in contact with the support structure 25. When the clips 101, 102 and 103 are seated in the corresponding pairs of notches 201, 202 and 203, respectively, the apertures in the medial portions 110, 120 and 130 of the clips are aligned with corresponding apertures in the bottom portion of the mounting bracket 200.

As shown in FIG. 3, the support structure 25 is an I-beam, and the bottom portion of the mounting bracket 200 lies on the web of the I-beam. The longitudinal dimension of the mounting bracket 200 is perpendicular to the flanged sides of the I-beam. The support structure 25 is also provided with apertures whereby the bolts 301, 302 and 303 passing through apertures in the medial portions 110, 120 and 130 of the clips 101, 102 and 103, respectively, and through aligned apertures in the bottom portion of the mounting bracket 200, also pass through correspondingly aligned apertures in the support structure 25. As shown in FIG. 3, the apertures in the I-beam support structure 25 are provided in the web of the I-beam. The bolts 301, 302 and 303 are secured to the support structure 25 by nuts 311, 321 and 331, respectively. In this way, the fastening means comprising bolt 301 and nut 311 coadunately fastens the resilient clip 101 and the bracket 200 to the support structure 25. In the same way, the fastening means comprising the bolt 302 and nut 321 coadunately fastens the clip 102 and the bracket 200 to the support structure 25, and the fastening means comprising the bolt 303 and nut 331 coadunately fastens the clip 103 and the bracket 200 to the support structure 25. The apertures in the support structure 25 that receive the bolts 301, 302 and 303 are preferably of square configuration to engage the sides of a correspondingly configured square portion on the underside of the head of each of the bolts 301, 302 and 303. In this way, rotation of the bolts is prevented as the nuts are tightened.

As the nut 311 is tightened on the end of the bolt 301, the resilient clip 101 is drawn into the pair of notches 201 on the edges of the arms of the mounting bracket 200. Similarly, as the nut 321 is tightened on the end of the bolt 302, the resilient clip 102 is drawn into the pair of notches 202; and as the nut 331 is tightened on the end of the bolt 303, the resilient clip 103 is drawn into the pair of notches 203. Thus, the fastening means comprising the bolt 301 and nut 311 not only coadunately fastens the clip 101 and the bracket 200 to the support structure 25, but also secures the clip 101 to the support structure 25 independently of the other clips 102 and 103. The other clips 102 and 103 are likewise each independently secured to the support structure 25. Thus, according to the mounting technique of the present invention, any looseness that might develop in the grip of, say, the nut 311 or the bolt 301 would not affect the tenacity with which the clips 102 and 103 grasp the insulating sleeves (with their enclosed conductive rails) that are held therein.

As the nuts 311, 321 and 331 are tightened on the bolts 301, 302 and 303, respectively, so as to draw the resilient clips 101, 102 and 103 into the pairs of notches 201, 202 and 203, respectively, the heads of the bolts 301, 302 and 303 in the preferred embodiment of this invention do not limit the extent to which the clips can be drawn into the notches. Without the wells 211, 221 and 231 as described above, however, the angled sides of the notches might slope inward to such an extent that the lateral span across the bottom portion of each notch might be less than the diameter of the head of the bolt in that notch, in which case the head of the bolt would prevent the clip from being drawn any further into the notch. In the preferred embodiment of the present invention, however, the wells 211, 221 and 231 are provided to insure that the span across the narrowest portion of each notch in the elongate direction of the mounting bracket 200 is greater than the diameter of the head of any of the bolts 301, 302 and 303.

In FIG. 4, the resilient clips 101, 102 and 103 are shown independently grasping and retaining the insulating sleeves 51, 61 and 71, respectively. The sleeve 51 is a tubular structure made of an insulating material such as polyvinyl chloride that encloses an electrically conductive rail 151. The insulating sleeve 61 is made of the same material and encloses an electrically conductive rail 161; and the insulating sleeve 71 is also made of the same material and encloses an electrically conductive rail 171. Each of the rails 151, 161 and 171 may be fabricated from an elongate metal strip that is folded along its longitudinal direction to have a flat medial portion and rounded edge portions. The sleeves 51, 61 and 71 are configured to fit tightly over the rounded edge portions of the rails 151, 161 and 171, respectively, enclosed therewithin. A longitudinal opening is provided in each of the sleeves 51, 61 and 71 so that the flat medial portion of the rail enclosed therein is exposed to sliding contact by an electrically conductive member such as a contact shoe that provides electrical power to a trolley or other type of movable device. As shown in FIG. 4, the I-beam support structure 25 can be mounted on a post 500 extending upward from the floor of the building in which the electrified rail system is installed. Bolts and nuts indicated by reference numbers 501 and 502, respectively, pass through apertures in one of the flanged sides of the I-beam support structure 25 to secure the support structure 25 to the post 500. In the same way, the support structure 25 could be secured to a frame or casing of a machine.

In FIG. 5, an electrically conductive rail system according to the present invention is shown in exploded view. The resilient clips 101, 102 and 103 are first seated in the corresponding pairs of notches 201, 202 and 203, respectively, that are provided on the edges of the arms of the mounting bracket 200. The bolts 301, 302 and 303 are then inserted through aligned apertures in the clips 101, 102 and 103, in the mounting bracket 200, and in the support structure 25, whereby each bolt coadunately and independently mounts one of the resilient clips and the mounting bracket 200 to the support structure 25. The nuts 311, 321 and 331 may then be placed on the ends of the bolts 301, 302 and 303, respectively, to hold the resilient clips and the mounting bracket 200 in place. The insulating sleeves 51, 61 and 71, enclosing the electrically conductive rails 151, 161 and 171, respectively, are then inserted in the resilient clips 101, 102 and 103, respectively. The nuts 311, 321 and 331 are then tightened on the ends of the bolts 301, 302 and 303, respectively, to draw the clips 101, 102 and 103 tightly into the pairs of notches 201, 202 and 203, respectively. Each clip is thereby secured independently of the other clips to the support structure 25.

Also shown in FIG. 5 is a technique whereby the support structure 25 can be suspended from the ceiling of a building in which an electrified rail system according to this invention is installed. A ceiling flange 600 at one end of a rod 610 is secured to the ceiling by appropriate means such as screws. The other end of rod 610 is secured (as by drilling and roll pinning) to the top end of a C-shaped bracket 620. The bottom end of the C-shaped bracket 620 is bolted to the I-beam support structure 25. As shown in FIG. 5, one end of a brace 630 is secured to the ceiling or wall of the building, and the other end of the brace 630 is secured to the C-shaped bracket 620 at a point intermediate the top and bottom ends thereof to prevent twisting of the bracket 620 about the rod 610. The bottom end of the C-shaped bracket 620 terminates in a flange 640 that is secured to the I-beam support structure 25 by bolts, washers, and nuts indicated by the reference numbers 650, 651, 652 and 653. Techniques for mounting the support structure 25 to the ceiling or floor, or to machine frames or casings, are not part of the present invention and are well-known to those skilled in the art.

The present invention resides in the technique for coadunately fastening a resilient clip and a mounting bracket together to a support structure by a single fastening means. This technique permits a plurality of such clips to be secured independently of each other to the support structure. As described above, the single fastening means comprises a bolt and nut. However, other fastening means that accomplish the same result may be feasible in particular applications, and would be within the scope of the present invention. Consequently, the foregoing description of the preferred embodiment is to be construed as illustrative rather than limiting, and the scope of the invention is defined by the following claims and their legal equivalents.

What is claimed is:

1. A mounting assembly for securing an electrically conductive rail to a support structure, said rail being enclosed in an electrically insulating sleeve, an opening being provided in said sleeve to permit sliding electrical contact along said rail by a means for conducting electrical power from said rail to a movable device, said mounting assembly comprising:
    (a) a resilient clip configured to grasp said insulating sleeve, said rail being retained within said sleeve;
    (b) a bracket configured to receive said clip; and
    (c) means passing through apertures in said clip and said bracket for coadunately fastening said clip and said bracket to said support structure.

2. The mounting assembly of claim 1 wherein said fastening means comprises an elongate member that extends through an apertured portion of said clip and an apertured portion of said bracket.

3. The mounting assembly of claim 2 wherein said fastening means comprises a bolt that secures said clip and said bracket to said support structure.

4. The mounting assembly of claim 2 wherein said apertured portion of said clip is of generally planar configuration located medially on said clip, and wherein first and second arm portions extend symmetrically from opposite sides of said medial portion of said clip.

5. The mounting assembly of claim 4 wherein each arm portion of said clip comprises a generally planar part that is proximal to said medial portion and a curved part that is distal from said medial portion.

6. The mounting assembly of claim 5 wherein at least said distal parts of said arm portions of said clip are coated with an electrically insulating material.

7. The mounting assembly of claim 6 wherein said insulating material is polyvinyl chloride.

8. The mounting assembly of claim 4 wherein said bracket is configured to contact said arm portions without contacting said medial portion of said clip when said clip is received by said bracket.

9. The mounting assembly of claim 5 wherein said bracket is configured to contact said proximal parts of said arm portions of said clip without contacting said medial portion of said clip when said clip is received by said bracket.

10. The mounting assembly of claim 8 wherein said elongate fastening member has a head portion that is too large to pass through said apertured portions of said clip and said bracket, said arm portions of said clip being configured to provide a space between said medial portion of said clip and said sleeve when said sleeve is grasped by said clip, said space being large enough to accommodate said head portion of said fastening member.

11. The mounting assembly of claim 10 wherein said head portion of said fastening member is accommodated in said space between said medial portion of said clip and said sleeve without contacting said sleeve.

12. The mounting assembly of claim 1 wherein said apertured portion of said bracket is of generally planar configuration located medially on said bracket, and wherein first and second arm portions extend symmetrically from opposite sides of said medial portion of said bracket, each of said arm portions of said bracket having a recess configured to receive said clip.

13. The mounting assembly of claim 12 wherein said apertured portion of said clip is of generally planar configuration located medially on said clip, and wherein first and second arm portions extend symmetrically from opposite sides of said medial portion of said clip, each arm portion of said clip comprising a generally planar part that is proximal to said medial portion of said clip and a curved part that is distal from said medial portion of said clip, and wherein said recess in each of said arm portions of said bracket receives said clip by making contact with said proximal part of each arm portion of said clip.

14. The mounting assembly of claim 13 wherein said recess in each of said arm portions of said bracket is a notch on the edge of said arm portion of said bracket.

15. The mounting assembly of claim 13 wherein said recess in each of said arm portions of said bracket is configured so as to preclude contact between said arm portions of said bracket and said apertured medial portion of said clip when said clip is received by said bracket.

16. The mounting assembly of claim 13 wherein said first and second arm portions of said bracket extend generally perpendicularly from said medial portion of said bracket.

17. The mounting assembly of claim 13 wherein said bracket is elongate along an axis that is generally perpendicular to the elongate dimension of said rail.

18. A mounting assembly for securing an electrified rail system to a support structure, said rail system comprising a plurality of electrically conductive rails disposed generally parallel to each other, each rail being enclosed in an electrically insulating sleeve, an opening being provided in said sleeve to permit sliding electrical contact along said rail by a means for conducting electrical power from said rail to a movable device, said mounting assembly comprising:
    (a) a plurality of resilient clips, each one of said clips grasping a corresponding one of said sleeves, a corresponding one of said rails being retained within each one of said sleeves;
    (b) a bracket configured to receive each one of said resilient clips; and
    (c) a plurality of fastening means, each one of said fastening means passing through an aperture in a corresponding one of said resilient clips and through aligned apertures in said bracket and said support structure, whereby each one of said clips is fastened to said support structure independently of any other of said clips.

19. A mounting assembly for securing an electrically conductive rail to a support structure, said rail being enclosed in an electrically insulating sleeve, an opening being provided in said sleeve to permit sliding electrical contact along said rail by a means for conducting electrical power from said rail to a movable device, said mounting assembly comprising:

(a) a resilient clip configured to exert a grasp on said insulating sleeve, said rail being retained within said sleeve;
(b) a bracket having a recessed portion configured to receive said clip; and
(c) means for fastening said clip and said bracket to said support structure, said fastening means comprising:
   (i) an elongate member extending through apertures in said clip and said bracket, and
   (ii) a tightening member for causing said elongate member to draw said clip into said recessed portion of said bracket, thereby increasing the grasp exerted by said clip on said insulating sleeve, said tightening member also immobilizing said elongate member with respect to said support structure.

20. The mounting assembly of claim 19 wherein said elongate member is a bolt extending through apertures in said clip and said bracket, and also extending through an aperture in said support structure; and wherein said tightening member is a nut fitted over a threaded end of said bolt.

* * * * *